(12) United States Patent
Handa et al.

(10) Patent No.: US 7,214,430 B2
(45) Date of Patent: May 8, 2007

(54) COMPOSITE MATERIAL

(75) Inventors: Koichi Handa, Tokyo (JP); Subiantoro, Tokyo (JP); Takayuki Tsukada, Tokyo (JP); Jiayi Shan, Tokyo (JP); Tsuyoshi Okubo, Tokyo (JP)

(73) Assignee: Bussan Nanotech Research Institute, Inc., Tokyo (JP)

( * ) Notice: Subject to any disclaimer, the term of this patent is extended or adjusted under 35 U.S.C. 154(b) by 32 days.

(21) Appl. No.: 11/323,555

(22) Filed: Dec. 29, 2005

(65) Prior Publication Data

US 2006/0216517 A1 Sep. 28, 2006

Related U.S. Application Data

(63) Continuation-in-part of application No. 11/247,769, filed on Oct. 11, 2005.

(30) Foreign Application Priority Data

Mar. 22, 2005 (JP) .............................. 2005-082776

(51) Int. Cl.
*B32B 9/00* (2006.01)
(52) U.S. Cl. ...................... 428/408; 977/742; 423/445
(58) Field of Classification Search ................ 428/408; 423/445, 448; 427/374.1; 977/DIG. 1
See application file for complete search history.

(56) References Cited

U.S. PATENT DOCUMENTS 5,648,056 A * 7/1997 Tanaka .................... 423/445 B
6,911,260 B2 * 6/2005 Ren et al. .................... 428/408

OTHER PUBLICATIONS

English translation of PCT/WO2004/070095, dated Aug. 19, 2004 (37 pages).
English translation of JP2003-0032733, dated Oct. 2, 2003 (32 pages).

* cited by examiner

*Primary Examiner*—Jennifer McNeil
*Assistant Examiner*—Daniel Miller
(74) *Attorney, Agent, or Firm*—Osha Liang LLP

(57) ABSTRACT

A composite material includes a matrix and carbon fibrous structures. The carbon fibrous structure has a three dimensional network of carbon fibers, each having an outside diameter of 15–100 nm, and has a granular part with which carbon fibers are bound in a state such that the carbon fibers extend outwardly from the granular part, and the granular part being produced in a growth process of the carbon fibers. The additive amount of the carbon fibers is in the range of 0.1 to 30% by weight of total weight of the composite material.

38 Claims, 7 Drawing Sheets

FIG. 5
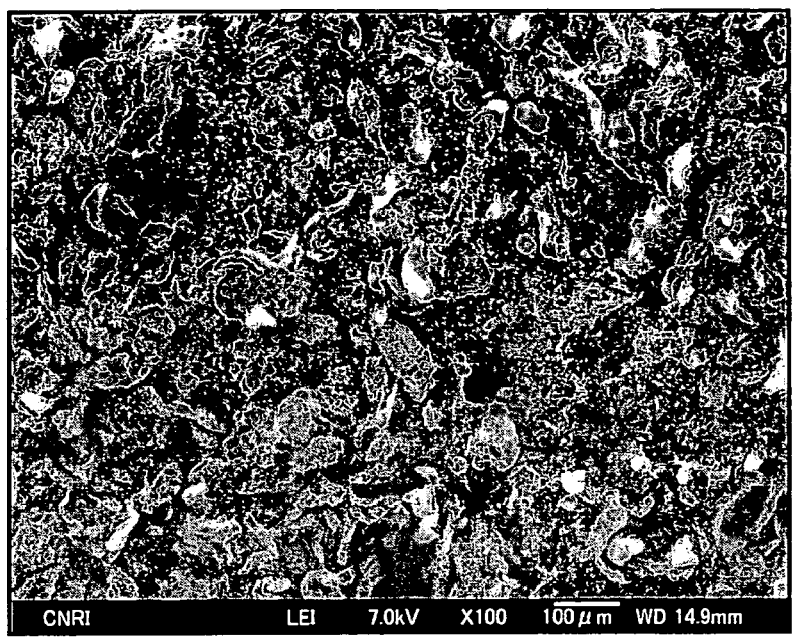
FIG. 6        BEST AVAILABLE COPY
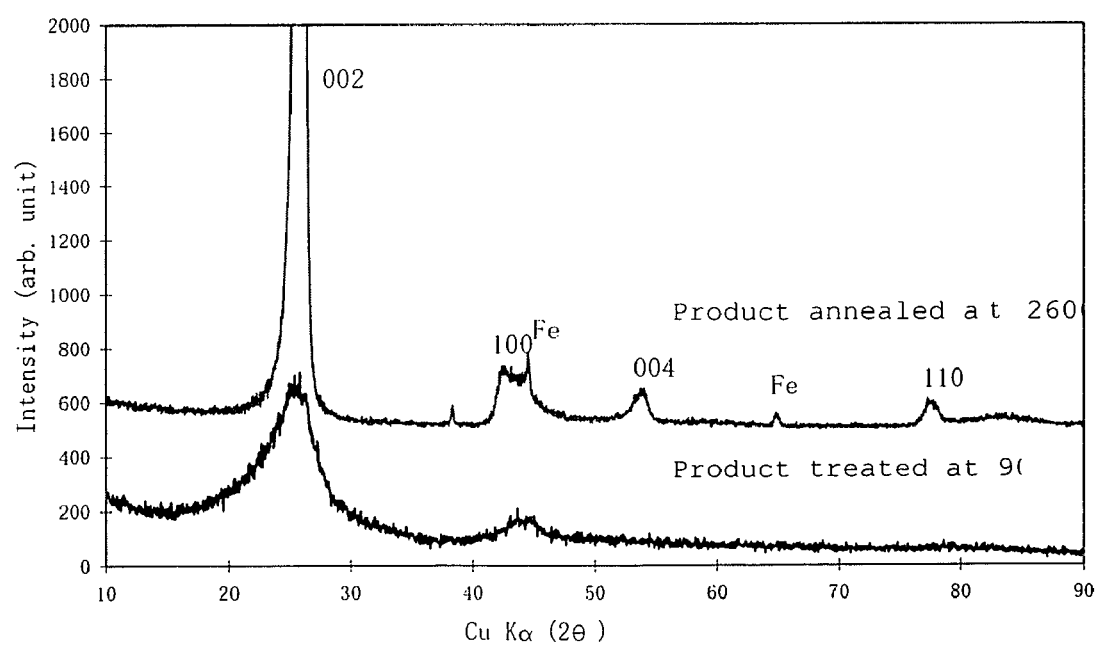

COMPOSITE MATERIAL

CROSS REFERENCES TO RELATED APPLICATIONS

This is a Continuation-In-Part of U.S. patent application Ser. No. 11/247,769 filed on Oct. 11, 2005 and claims priority of Japanese Patent Application No. 2005-82776, filed on Mar. 22, 2005. This is related to U.S. patent application Ser. No. 11/147,742, filed on Jun. 8, 2005. These applications are incorporated herein by reference in their entireties.

TECHNICAL FIELD

This invention relates to a new composite material. Particularly, this invention relates to a composite material comprising fine carbon fibrous structures which may be flexibility and may have a high strength and may have toughness unique configuration blended in a matrix.

BACKGROUND ART

To date, composite preparations comprising plural materials have been developed in order to attain unique characteristics that are not found in any single material. As an example, glass fiber reinforced plastic has been widely used. The successful development of carbon fibers and reinforced plastic containing carbon fibers (CFRP) has brought such composite materials into general use.

These materials have been widely used in sporting goods and so on, and have also gained much attention as a light weight-, high intensity- and high elastic modulus-structural material for aircrafts. In addition to the fiber reinforced materials mentioned above, composite materials reinforced with minute particles have also been successfully developed. Composite materials, while generally regarded as structural materials for their structural properties, such as strength and heat resistance, are increasingly being recognized as functional materials for their electric, electronic, optical, and chemical characteristics.

As various electronic devices increases, problems such as malfunction of devices caused by static electricity and electromagnetic wave interference caused by noises from certain electronic components affect peripheral equipments are also on the rise. In order to solve these problems, materials that have excellent functional characteristics such as conductivities and damping abilities are required in this field. Traditional conductive polymer materials currently in use are made by blending high conductive fillers with low conductive polymers. In such materials, metallic fibers, metallic powder, carbon black, carbon fibers, and other similar materials are generally used as conductive fillers. However, there are several drawbacks in these types of materials. For example, when using metallic fibers and metallic powders as the conductive filler, the materials thus obtained have poor corrosion resistance and mechanical strength. When using carbon fibers as the conductive filler, although a predetermined strength and elastic modulus may be obtained by adding relatively large amounts of the filler, electrical conductivity generally cannot be greatly enhanced by this approach. If one attempts to attain a predetermined conductivity by adding a large amount of filler, one would invariably degrade the intrinsic properties of the original resin material. Incidentally, with respect to a carbon fiber, it is expected that its conductivity imparting effect increases as its diameter becomes smaller at an equivalent additive amount, because the contact area between the fiber and the matrix resin increases.

Carbon fibers may be manufactured by subjecting a precursor organic polymer, particularly, a continuous filament of cellulose or polyacrylonitrile, to thermal decomposition under a well controlled condition, in which a forced tension on the precursor polymer is carefully maintained in order to achieve a good orientation of anisotropic sheets of carbon in the final product. In such manufacturing processes, the level of material loss during carbonization is high and the carbonization rate is slow. Therefore, carbon fibers made by these processes tend to be expensive.

In recent years, a different class of carbon fibers, i.e., fine carbon fibers such as carbon nano structures, exemplified by the carbon nanotubes (hereinafter, referred to also as "CNT"), have been attracting public attention.

The graphite layers that make up the carbon nano structures are materials normally comprised of regular arrays of six-membered ring whose structures can bring about specific electrical properties, as well as chemically, mechanically, and thermal stable properties. As long as such fine carbon fibers can retain such properties upon combining and dispersion into solid materials, including various resins, ceramics, metals, etc., or into liquid materials, including fuels, lubricant agents, etc., their usefulness as additives for improving material properties can be expected.

On the other hand, however, such fine carbon fibers unfortunately show an aggregate state even just after their synthesis. When these aggregates are used as-is, the fine carbon fibers would be poorly dispersed into the matrix, and thus the product obtained would not benefit from the desired properties of the nano structures. Accordingly, given a desired property such as electrical conductivity for a matrix such as a resin, it is necessary that the fine carbon fibers would be added in a large amount.

Japanese patent No. 2862578 discloses a resin composition comprising aggregates, wherein each of the aggregates is composed of mutually entangled carbon fibrils having 3.5–70 nm in diameter, and wherein the aggregates possess a diameter in the range of 0.10 to 0.25 mm with a maximum diameter of not more than 0.25 mm. It is noted that the numeric data such as the maximum diameter, diameter, etc., for the carbon fibril aggregates are those measured prior to combining with resin, as is clear from the description in the examples and other parts of the patent literature. The related parts of Japanese patent No. 2862578 are incorporated herein by reference.

JP-2004-119386A discloses a composite material, wherein a carbon fibrous material is added to the matrix. The carbon fibrous material is mainly comprised of aggregates, each of which is composed of carbon fibers having 50–5000 nm in diameter. The mutual contacting points among the carbon fibers are fixed with carbonized carbonaceous substance. Each of the aggregates has a size of 5 µm–500 µm. In this reference, the numeric data such as the size of aggregates, etc., are those measured prior to combining with resin. The related parts of JP-2004-119386A are incorporated herein by reference.

Using carbon fiber aggregates such as those described above, it is expected that the dispersibility of carbon nano structures within a resin matrix will improve to a certain degree as compared with that of using bigger lumps of carbon fibers. Aggregates prepared by dispersing carbon fibrils under a certain shearing force, such as in a vibrating ball mill or the like, according to Japanese patent No. 2862578, however, have relative high bulk densities. Thus, they do not fulfill the need for ideal additives that are capable of improving various characteristics of a matrix, such as electrical conductivity, at small dosages.

JP-2004-119386A discloses a carbon fibrous structure, which is manufactured by heating carbon fibers in a state such that mutual contacting points among the carbon fibers are formed by compression molding after synthesis of the carbon fibers, and wherein the fixing of the fibers at the contacting points is done by carbonization of organic residues primarily attached to the surface of the carbon fibers, or carbonization of an organic compound additionally added as a binder. Since the fixing of carbon fibers is performed by such a heat treatment after synthesis of the carbon fibers, the affixing forces at the contacting points are weak and do not result in good electrical properties of the carbon fibrous structures. When these carbon fibrous structures are added to a matrix such as a resin, the carbon fibers fixed at the contacting points are easily detached from each other, and the carbon fibrous structures are no longer maintained in the matrix. Therefore, it is not possible to construct preferable conductive paths in a matrix such that good electrical properties may be conferred on the matrix by a small additive amount of the carbon fibrous structures. Furthermore, when a binder is added to promote fixing and carbonization at the contacting points, fibers in the obtained fibrous structures would have large diameters and inferior surface characteristics because the added binder is attached to the whole surface areas of the fibers rather than to limited areas on the contacting points.

SUMMARY OF THE INVENTION

Therefore, this invention aims to provide new composite materials capable of solving some or all of above mentioned problems. This invention also aims to provide composite materials having improved physical properties, such as electrical, mechanical and thermal properties, without significantly damaging the innate characteristics of the matrix. These composite materials are prepared by using a small amount of new carbon fibrous structures that have physical properties suitable for use as fillers in composite preparations.

As a result of our diligent study for solving the above problems, we, the inventors have found that the followings are effective in improving various properties of a matrix even at a limited additive amount, and finally accomplished the present invention:

To adapt carbon fibers having a diameter as small as possible;

To make a sparse structure of the carbon fibers, where the fibers are mutually bound so that the fibers do not behave individually and which maintain their sparse state in the resin matrix; and To adapt carbon fibers that are designed to have a minimum amount of defects.

The present invention for solving the above mentioned problem is, therefore, exemplified by composite materials that each comprises a matrix and carbon fibers. The carbon fibers having a fibrous structure comprises a three dimensional network of carbon fibers, each of which having an outside diameter of 15–100 nm, wherein the carbon fibrous structure further comprises a granular part, at which two or more carbon fibers are tied together such that the carbon fibers extend outwardly therefrom, and wherein the granular part is produced in a growth process of the carbon fibers. The additive amounts of the carbon fibrous structures in these composite materials are in the range of 0.1 to 30% by weight of total weights of the composite materials.

One embodiment of the present invention, the carbon fibrous structures used in the composite materials may have an area based circle-equivalent mean diameter of 50–100 µm.

In another embodiment, the carbon fibrous structures used in the composite materials may have a bulk density in the range of 0.0001–0.05 g/cm$^3$.

In still another embodiment, the carbon fibrous structures used in the composite materials may have an $I_D/I_G$ ratio determined by Raman spectroscopy of not more than 0.2.

In a further embodiment, the carbon fibrous structures used in the composite materials may have combustion initiation temperatures in air of not less than 750° C.

In a preferred embodiment, the diameter of the granular part is larger than the outside diameters of the carbon fibers.

In a further embodiment, the carbon fibrous structures are produced using a carbon source of at least two carbon compounds, which have different decomposition temperatures.

In an embodiment of the present invention, a composite material comprises an organic polymer as a matrix.

In another embodiment of the present invention, a composite material comprises an inorganic material as a matrix.

In a further embodiment of the present invention, a composite material comprises a metal as a matrix.

In still another embodiment of the present invention, a composite material further comprises at least one kind of filling agent selected from the group consisting of metallic minute particles, silica, calcium carbonate, magnesium carbonate, carbon black, glass fiber and carbon fiber different from the fine carbon fiber.

According to embodiments of the present invention, since the carbon fibrous structures are comprised of three dimensionally configured carbon fibers having ultrathin diameters and bound together by a granular part produced in a growth process of the carbon fibers such that the carbon fibers extend outwardly from the granular part, the carbon fibrous structures can disperse promptly into a matrix (such as a resin) upon adding, while maintaining their sparce structure. Even when they are added at a small amount to a matrix, they can be distributed uniformly over the matrix. Therefore, with respect to electrical conductivity, it is possible to obtain good electrical conductive paths throughout the matrix even with a small dosage. With respect to mechanical and thermal properties, improvements can be expected in analogous fashions, since the carbon fibrous structures are distributed evenly as fillers into the matrix with only a small dosage. Therefore, by this invention, composite materials can be obtained that are useful as functional materials having good electric conductivity, electric wave shielding ability, heat conductivity, etc., or as structural materials having a high strength, or the like.

BRIEF DESCRIPTION OF THE DRAWINGS

FIG. 5 is another scanning electron micrograph (SEM photo) of a carbon fibrous structure used in a composite material according to one embodiment of the present invention;

FIG. 6 is an X-ray diffraction chart of a carbon fibrous structure used in a composite material according to one embodiment of the present invention and an intermediate thereof;

BEST MODE FOR CARRYING OUT THE INVENTION

Now, the present invention will be described in detail with reference to some embodiments, which are not to be construed as limiting, and disclosed only for the purpose of facilitating the illustration and understanding of the present invention.

A composite material according to embodiments of the present invention is characterized by the fact that it includes in the matrix carbon fibrous structures, each of which has a three-dimensional network structure described later, in an amount in the range of 0.1 to 30% by weight of total weight of the composite material.

Figure 3:
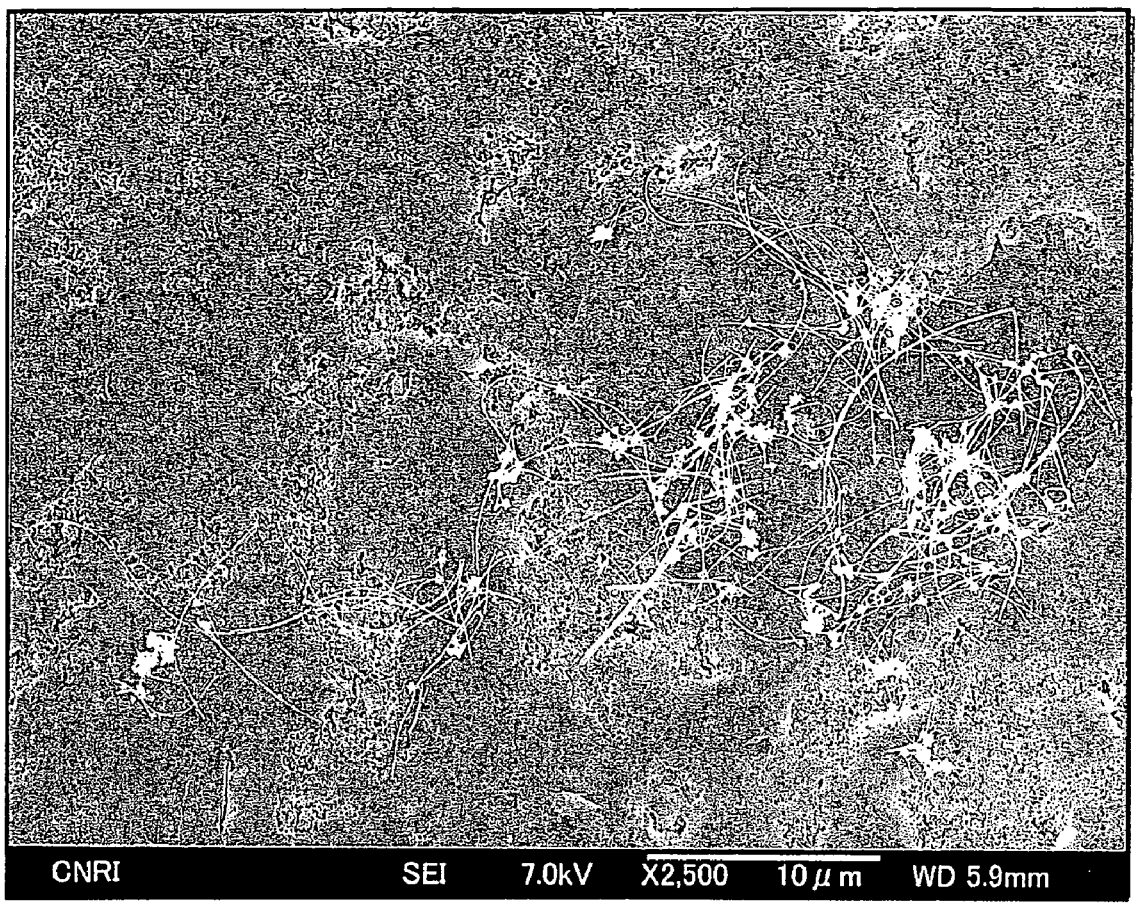
FIG. 3 is a scanning electron micrograph (SEM photo) of a carbon fibrous structure used in a composite material according to one embodiment of the present invention.
Figure 4A:
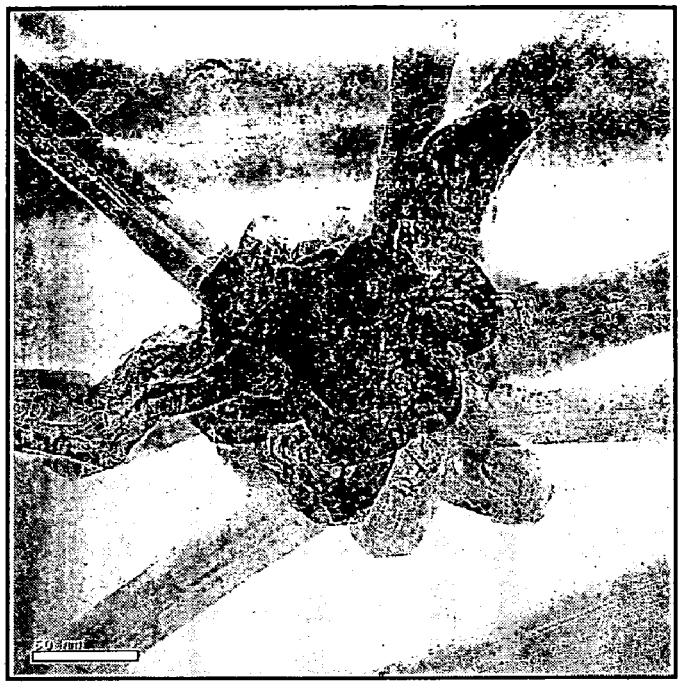
FIGS. 4A and 4B are transmission electron micrographs (TEM) of a carbon fibrous structure used in a composite material according to one embodiment of the present invention.
Figure 4B:

Carbon fibrous structures to be used in a composite material according to the present invention are, as shown in SEM photo of FIG. 3 and TEM photos of FIGS. 4A and 4B, composed of a three-dimensionally network of carbon fibers each having an outside diameter of 15–100 nm, and a granular part at which the carbon fibers are bound together so that the carbon fibers elongate (extend) outwardly from the granular part.

The reason for restricting the outside diameters of the carbon fibers to a range of 15 nm to 100 nm because when the outside diameter is less than 15 nm, the cross section of the carbon fibers cannot have polygonal figures as described later. Given the same number of carbon atoms, the smaller the diameter of a fiber, the longer its length is in the axial direction and the better its electrical conductivity. Thus, carbon fibrous structures having an outside diameter exceeding 100 nm are not preferred for use as modifiers or additives for a resin etc. Particularly, it is more desirable for the outside diameter of the carbon fiber to be in the range of 20–70 nm. Carbon fiber that have a diameter within the preferable range and whose tubular graphene sheets are layered one by one in the direction that is orthogonal to the fiber axis, i.e., being of a multilayer type, can enjoy a high bending stiffness and ample elasticity. In other words, such fibers would easily restore to their original shape after undergoing any deformation. Therefore, even if the carbon fibrous structures have been compressed prior to being mixed into the matrix material, the fibers still tend to take a sparse structure in a matrix.

Annealing at a temperature of not less than 2400° C. causes carbon fibers to have polygonal cross sections. Additionally, annealing increases the true density of carbon fiber from 1.89 g/cm$^3$ to 2.1 g/cm$^3$. As a result, the carbon fibers become denser and have fewer defects in both the stacking direction and the surface direction of the graphene sheets that make up the carbon fiber, and their flexural rigidity (EI) and dispersibility in a resin can also be enhanced and improved.

Additionally, it is preferable that the outside diameter of a fine carbon fiber varies along the axial direction of the fiber. In the case that the outside diameter of the carbon fiber is not constant, but changes along the length of the fiber, it would be expected that some anchoring effect may be provided to the carbon fiber at the fiber/matrix interface, and thus the migration of the carbon fibrous structure in the matrix can be restrained, leading to improved dispersion stability.

Thus, in a carbon fibrous structure according to embodiments of the present invention, the three dimensional network configured fine carbon fibers having a predetermined outside diameter are bound together by a granular part produced in a growth process of the carbon fibers so that the carbon fibers externally elongated from the granular part. Since multiple fine carbon fibers are not only entangled with each other, but also bound together firmly at the granular part, the carbon fibers will not disperse as single fibers, but will be dispersed as bulky carbon fibrous structures when added to a matrix (such as a resin). Also, since the fine carbon fibers are bound together by a granular part produced in the growth process of the carbon fibers, in a carbon fibrous structure according to embodiments of the present invention, the carbon fibrous structure itself can enjoy superior properties such as electrical property. For instance, when determining electrical resistance under a certain pressed density, carbon fibrous structures according to embodiments of the present invention have an extremely low resistivity, as compared with that of a simple aggregate of the carbon fibers and that of a carbon fibrous structure in which the fine carbon fibers are fixed at the contacting points with a carbonaceous material or carbonized after the synthesis of the carbon fibers. Thus, when carbon fibrous structures according to embodiments of the present invention are added and distributed in a matrix, they can form good conductive paths within the matrix.

Figure 2:
FIG. 2 is a transmission electron micrograph (TEM photo) of an intermediate for the carbon fibrous structure used in a composite material according to one embodiment of the present invention.

Furthermore, although not specifically limited, it is preferable that the diameter of the granular part is larger than the outside diameter of the carbon fibers as shown in FIG. 2. When the granular part, which is the binding site of the carbon fibers, has a much larger particle diameter, the carbon fibers that are externally elongated from the granular part have stronger binding force, and thus, even when the carbon fibrous structures are exposed to a relatively high shear stress during blending with a matrix (such as a resin), they can be dispersed as bulky carbon fibrous structures into the matrix. The "particle diameter of the granular part" as used herein is the value which is measured by assuming that the granular part, which is the binding site for the mutual carbon fibers, is one spherical particle.

In carbon fibrous structures according to embodiments of the present invention, it is preferable that the carbon fibrous structure has an area based circle-equivalent mean diameter of 50–100 μm. The "area based circle-equivalent mean diameter" used herein is the value which is determined by taking a picture for the outside shapes of the carbon fibrous structures with a suitable electron microscope, etc., tracing the contours of the respective carbon fibrous structures in the obtained picture using a suitable image analysis software, e.g., WinRoof™ (Mitani Corp.), measuring the area within each individual contour, calculating the circle-equivalent mean diameter of each individual carbon fibrous structure, and then, averaging the calculated data.

Although it is not to be applied in all cases because the circle-equivalent mean diameter may be influenced by the kind of the matrix material such as a resin to be complexed, the circle-equivalent mean diameter may become a factor by which the maximum length of a carbon fibrous structure upon blending into a matrix such as a resin is determined. In general, when the circle-equivalent mean diameter is not more than 50 μm, the electrical conductivity of the obtained composite may not be expected to reach a sufficient level, while when it exceeds 100 μm, an undesired increase in viscosity may be expected to happen upon kneading of the carbon fibrous structures in the matrix. The increase in viscosity may be followed by failure of combining and dispersion or may result in an inferior moldability.

Furthermore, the carbon fibrous structure according to embodiments of the present invention may exhibit a bulky, loose form, in which the carbon fibers are sparsely dispersed, because the carbon fibrous structure is comprised of carbon fibers that are configured three dimensionally and are bound together by a granular part so that the carbon fibers are externally elongated from the granular part as mentioned above. It is desirable that the bulk density thereof is in the range of 0.0001–0.05 g/cm$^3$, more preferably, 0.001–0.02 g/cm$^3$. When the bulk density exceeds 0.05 g/cm$^3$, improvement of physical properties of a matrix such as a resin would become difficult with a small dosage.

Furthermore, a carbon fibrous structure according to embodiments of the present invention can enjoy good electrical properties in itself, since the carbon fibers in the structure are bound together by a granular part produced in the growth process of the carbon fibers as mentioned above. For instance, it is desirable that a carbon fibrous structure according to embodiments of the present invention has a resistance determined under a certain pressed density (0.8 g/cm$^3$) of not more than 0.02Ω·cm, more preferably, 0.001 to 0.10Ω·cm. If the particle's resistance exceeds 0.02Ω·cm, it may become difficult to form good conductive paths when the structure is added to a matrix such as a resin.

In order to enhance the strength and electrical conductivity of a carbon fibrous structure according to embodiments of the present invention, it is desirable that the graphene sheets that make up the carbon fibers have a minimum number of defects, and more specifically, for example, the $I_D/I_G$ ratio of the carbon fibers determined by Raman spectroscopy, is not more than 0.2, more preferably, not more than 0.1. Incidentally, in Raman spectroscopic analysis, with respect to a large single crystal graphite, only the peak (G band) at 1580 cm$^{-1}$ appears. When the crystals are of finite minute sizes or have any lattice defects, the peak (D band) at 1360 cm$^{-1}$ can appear. Therefore, when the peak intensity (or magnitude) ratio ($R=I_{1360}/I_{1580}=I_D/I_G$) of the D band and the G band is below the selected range as mentioned above, it is possible to say that there is little defect in the graphene sheets.

Furthermore, it is desirable that the carbon fibrous structure according to embodiments of the present invention has a combustion initiation temperature in air of not less than 750° C., preferably, 800° C.–900° C. Such a high thermal stability would be brought about by the above mentioned facts that it has little defects and that the carbon fibers have a predetermined outside diameter.

A carbon fibrous structure according to embodiments of the invention having the above described form may be prepared as follows. One of ordinary skill in the art would appreciate that the following examples are for illustration only and are not intended to limit the scope of the present invention.

Basically, an organic compound such as a hydrocarbon is thermally decomposed through the CVD (chemical vapor decomposition) process in the presence of ultraminute particles of a transition metal as a catalyst in order to obtain a fibrous structure (hereinafter referred to as an "intermediate"). Then, the intermediate thus obtained undergoes a high temperature heating treatment.

As a raw material organic compound, hydrocarbons such as benzene, toluene, xylene; carbon monoxide (CO); and alcohols such as ethanol may be used. It is preferable, but not limited, to use as carbon sources at least two carbon compounds that have different decomposition temperatures. Incidentally, the words "at least two carbon compounds" as used herein not only two or more kinds of raw materials, but also include one kind of raw material which can undergo a fragmentation or decomposition reaction, such as hydrodealkylation of toluene or xylene, during the course of synthesis of the fibrous structure such that in the subsequent thermal decomposition (CVD) procedure it can function as at least two kinds of carbon compounds having different decomposition temperatures.

Inert gases such as argon, helium, xenon; and hydrogen may be used as an atmosphere gas (or carrier gas).

A mixture of transition metal such as iron, cobalt, or molybdenum, or transition metal compounds such as ferrocene, metal acetate; and sulfur or a sulfur compound such as thiophene, ferric sulfide; may be used as a catalyst.

The intermediate may be synthesized using a CVD process with hydrocarbon or etc., which has been conventionally used in the art. The steps may comprise gasifying a mixture of hydrocarbon and a catalyst as a raw material, supplying the gasified mixture into a reaction furnace along with a carrier gas (such as hydrogen gas, etc.), and thermally decomposition at a temperature in the range of 800° C.–1300° C. By following such synthesis procedures, the product obtained is an aggregate, which is of several to several tens of centimeters in size and which is composed of sparse carbon fibrous structures (intermediates), each of which show a three dimensional configuration where fibers having 15–100 nm in outside diameters are bound tohether by a granule that has been grown around the catalyst particle as the nucleus.

The thermal decomposition reaction of the hydrocarbon raw material mainly occurs on the surface of the catalyst particles or on growing surface of granules that have grown around the catalyst particles as the nucleus, And the fibrous growth of carbon may be achieved when recrystallization of the carbons generated by the decomposition progresses in a constant direction. When obtaining carbon fibrous structures according to embodiments of the present invention, however, the balance between the decomposition rate and the carbon fiber growth rate is intentionally varied. Namely, for instance, as mentioned above, to use as carbon source at least two kinds of carbon compounds having different decomposition temperatures may allow the carboneous material to grow three dimensionally around the particle as a centre, rather than in one dimensional direction. The three dimensional growth of the carbon fibers depends not only on the balance between the decomposition rate and the growing rate, but also on the selectivity of the crystal face of the catalyst particle, residence time in the reaction furnace, temperature distribution in the furnace, etc. The balance between the decomposition rate and the growing rate is affected not only by the kind of the carbon sources mentioned above, but also by reaction temperatures, and gas temperatures, etc. Generally, when the growing rate is faster than the decomposition rate, the carbon material tends to grow into fibers, whereas when the decomposition rate is faster than the growing rate, the carbon material tends to grow in the peripheral directions of the catalyst particle. Accordingly, by changing the balance between the decomposition rate and the growing rate intentionally, it is possible to control the growth of the carbon material to occur in multi-directions rather than in single direction, and to produce a three dimensional configuration according to embodiments of the present invention.

In order to form the above mentioned three dimensional configuration, where the fibers are bound together by a granule, with ease, it is desirable to optimize the compositions such as the catalyst used, the residence time in the reaction furnace, the reaction temperature, the gas temperature.

The intermediate obtained by heating the mixture of the catalyst and hydrocarbon at a constant temperature in the range of 800° C.–1300° C. has a structure that resembles some patch-like sheets of carbon atoms laminated together (and being still in a half-raw, incomplete condition). When analyzed with Raman spectroscopy, the D band of the intermediate is very large and many defects are observed. Further, the obtained intermediate is associated with unreacted raw materials, nonfibrous carbon, tar, and catalyst metal.

Therefore, the intermediate is subjected to a high temperature heat treatment using a proper method in order to remove such residues from the intermediate and to produce the intended carbon fibrous structure with few defects.

For instance, the intermediate may be heated at 800–1200° C. to remove the unreacted raw material and volatile flux such as the tar, and thereafter annealed at a high temperature of 2400–3000° C. to produce the intended structure, and concurrently, to vaporize the catalyst metal, which is included in the fibers, to remove it from the fibers. In this process, it is possible to add a small amount of a reducing gas and carbon monoxide into the inert gas atmosphere to protect the carbon structures.

By annealing the intermediate at a temperature of 2400–3000° C., the patch-like sheets of carbon atoms are rearranged to associate with each other and then form multiple graphene sheet-like layers.

After or before such a high temperature heat treatment, the aggregates may be subjected to crushing in order to obtain carbon fibrous structures, each having an area based circle-equivalent mean diameter of several centimeters. Then, the obtained carbon fibrous structures may be subjected to pulverization in order to obtain the carbon fibrous structures having an area based circle-equivalent mean diameter of 50–100 μm. It is also possible to perform pulverizing directly without crushing. On the other hand, the initial aggregates involving plural carbon fibrous structures according to embodiments of the present invention may also be granulated for adjusting their shapes, sizes, or bulk density to one's suitable for using in a particular application. More preferably, in order to utilize effectively the above structure formed from the reaction, the annealing would be performed in a state such that the bulk density is low (the state that the fibers are extended as much as they can and the voidage is sufficiently large). Such a state may contribute to improved electrical conductivity of a resin matrix.

The carbon fibrous structures to be used in embodiments of the present invention may have the following properties:

A) a low bulk density;
B) a good dispersibility in a matrix such as a resin;
C) a high electrical conductivity;
D) a high heat conductivity;
E) a good slidability;
F) a good chemical stability;
G) a high thermal stability; and etc.

Thus, a carbon fibrous structures can be used in a wide range of applications, for example, as a filler for composite material to be added to solid materials, such as resins, ceramics, metals, etc., or as an additive to liquid materials such as fuels, lubricating oils, etc.

Organic polymer, inorganic material, metal, and so on can be used as a matrix to distribute carbon fibrous structures in a composite material according to embodiments of the present invention as mentioned above. In preferred embodiments, organic polymers are used.

Example of organic polymers may include various thermoplastic resins such as polypropylene, polyethylene, polystyrene, polyvinyl chloride, polyacetal, polyethylene terephthalate, polycarbonate, polyvinyl acetate, polyamide, polyamide imide, polyether imide, polyether ether ketone, polyvinyl alcohol, poly phenylene ether, poly(meth)acrylate, and liquid crystal polymer; and various thermosetting resins such as epoxy resin, vinyl ester resin, phenol resin, unsaturated polyester resin, furan resins, imide resin, urethane resin, melamine resin, silicone resin and urea resin; as well as various elastmers, such as natural rubber, styrene butadiene rubber (SBR), butadiene rubber (BR), polyisoprene rubber (IR), ethylene-propylene rubber (EPDM), nitrile rubber (NBR), polychloroprene rubber (CR), isobutylene isoprene rubber (IIR), polyurethane rubber, silicone rubber, fluorine rubber, acrylic rubber (ACM), epichlorohydrin rubber, ethylene acrylic rubber, norbornene rubber and thermoplastic elastomer. The above organic polymers are examples, not intended to be limiting.

Further, the organic polymer may be present in a composition with other materials, such as adhesive, fibers, paint, ink, etc.

For example, the matrix may comprise an adhesive agent, such as an epoxy type adhesive, acrylic type adhesive, urethane type adhesive, phenol type adhesive, polyester type adhesive, polyvinyl chloride type adhesive, urea type adhesive, melamine type adhesive, olefin type adhesive, acetic acid vinyl type adhesive, hotmelt type adhesive, cyano acrylate type adhesive, rubber type adhesive, cellulose type adhesive, etc.; fibers, such as acrylic fibers, acetate fibers, aramid fiber, nylon fibers, novoloid fibers, cellulose fibers, viscose rayon fibers, vinylidene fibers, vinylon fibers, fluorine fibers, polyacetal fibers, polyurethane fibers, polyester fibers, polyethylene fibers, polyvinyl chloride fibers, polypropylene fibers, etc.; or a paint or ink, such as a phenol resin type, alkyd type, epoxy type, acrylic resin type, unsaturated polyester type, polyurethane type, silicon type, fluorine resin type, synthetic resin emulsion type, etc.

Examples of inorganic materials may include ceramic materials, inorganic oxide polymers, and the like. As preferred examples, carbon material such as carbon composite, glass, glass fiber, flat glass and the other forming glass, silicate ceramics and other heat resisting ceramics, e.g. aluminum oxide, silicon carbide, magnesium oxide, silicone nitride and boron nitride, may be included.

Also, when the matrix is metal, preferred metals may include aluminum, magnesium, lead, copper, tungsten, titanium, niobium, hafnium, vanadium, and alloys and mixtures thereof. The above list is for illustration only and not intended to limit the scope of the invention.

Moreover, in a composite material according to embodiments of the present invention, it is possible to include other filling agents in addition to the above mentioned carbon fibrous structure. Examples of filling agents may include metallic minute particles, silica, calcium carbonate, magnesium carbonate, carbon black, glass fibers, carbon fibers. The above are non-limiting examples. Furthermore, these agents may be used singly or in any combination of two or more agents.

A composite material according to embodiments of the present invention includes the aforementioned carbon fibrous structures at an effective amount in a matrix mentioned above. Although the amount of the added carbon fibrous structures depends on the intended use of the composite material and the kind of matrix used, this amount typically is in the range of about 0.1 to about 30% by weight of total weight of the composite material. At less than 0.1% by weight, the carbon fiber additive may be less effective in providing enhancement in the mechanical strength of a structural material or enhancement in electric conductivity. At more than 30% by weight, the mechanical strength of the matrix material may be degraded or the adhesive property of a paint, an adhesive, etc., may become worse. In a composite material according to embodiments of the present invention, the carbon fibrous structures can disperse themselves uniformly throughout the matrix even when the carbon fibrous structures are added in a relative small amount. As described above, the composite materials may be obtained for use as a functional material, bearing good electric conductivity, electromagnetic wave shielding ability, heat conductivity, etc., or as a structural material, having a high strength, or the like.

Examples of composite materials of the present invention may be classified according to the intended function of the carbon fibrous structures included therein. The following are examples for illustration purpose only and are not intended to limit the scope of the invention.

1) Composite Having Electric Conductivity

For example, by combining carbon fibrous structure with a resin, the resultant conductive resin and conductive resin molded body may be suitably used as a wrapping material, gasket, container, resistance body, conductive fiber, electric wire, adhesive, ink, paint, and etc. Similar effects can be expected from the composite materials in which the carbon fibrous structures are added to an inorganic material, particularly, ceramic, metal, and etc. in addition to the above mentioned composite with a resin.

2) Composite Having Heat Conductivity

The above described composites that are used for enhanced electrical conductivity may also be used for enhanced heat conductivity.

3) Electromagnetic Wave Shields

By combining carbon fibers with a resin, resulting resin can be suitably used as electromagnetic wave shielding paint as well as electromagnetic wave shielding material for molding.

4) Composites Having Unique Physical Characteristics

By combining them with a matrix such as resin or metal to improve the sliding ability of the matrix, which can then be used for rollers, brake parts, tires, bearings, lubricating oils, cogwheels, pantographs, etc.

Also, by taking advantage of their light-weight and toughness, they can be used in wires, bodies of consumer electronics or cars or airplanes, housing of machines, etc.

Additionally, it is possible to use them as a substitute for conventional carbon fibers or beads, as well as use in polar materials of batteries, switches, vibration damper and etc.

5) One which Uses its Filler Characteristics

The fine carbon fibers in the carbon fibrous structure have excellent strength, moderate flexibility and elasticity. Thus, these carbon fibrous structures have excellent filler characteristics for forming network structures. By using these characteristics, it is possible to improve the poles of energy devices, such as lithium ion rechargeable battery, lead storage battery, capacitor, and fuel cell, and to improve the cycle characteristics of the energy devices.

EXAMPLES

Hereinafter, this invention will be illustrated in detail by practical examples. However, it is to be understood that these examples are given for illustrative purpose only, and the invention is not limited thereto.

The respective physical properties illustrated later are measured by the following protocols.

1) Area Based Circle-Equivalent Mean Diameter

First, a photograph of pulverized product was taken with SEM. On the taken SEM photo, only carbon fibrous structures with a clear contour were taken as objects to be measured, and the broken ones with unclear contours were omitted. Using all carbon fibrous structures that can be taken as objects in one single field of view (approximately, 60–80 pieces), about 200 pieces in total were measured with three fields of views. Contours of the individual carbon fibrous structures were traced using an image analysis software, WinRoof™ (Mitani Corp.), and the area within each individual contour was measured, circle-equivalent mean diameter of each individual carbon fibrous structure was calculated, and then, the calculated data were averaged to determine the area-based circle-equivalent mean diameter.

2) Bulk Density 1 g of powder was placed into a 70 mm caliber transparent circular cylinder equipped with a distribution plate, then, air supply at 0.1 Mpa of pressure, and 1.3 liter in capacity was applied from the lower side of the distribution plate in order to blow off the powder and thereafter allowed the powder to settle naturally. After the fifth air blowing, the height of the settled powder layer was measured. Any 6 points were adopted as the measuring points, and an average of the 6 points was calculated in order to determine the bulk density.

3) Raman Spectroscopic Analysis

The Raman spectroscopic analysis was performed with LabRam 800, manufactured by HORIBA JOBIN YVON, S.A.S., using 514 nm argon laser.

4) TG Combustion Temperature

Combustion behavior was determined using TG-DTA, manufactured by MAX SCIENCE CO. LTD., at an air flow rate of 0.1 liter/minute and a heating rate of 10° C./minute. When burning occurs, TG indicates a quantity reduction and DTA indicates an exothermic peak. Thus, the top position of the exothermic peak was defined as the combustion initiation temperature.

5) X Ray Diffraction

Using the powder X ray diffraction equipment (JDX3532, manufactured by JEOL Ltd.), carbon fibours structures after annealing processing were examined. Kα ray generated with Cu tube at 40 kV, 30 mA was used, and the measurement of the spacing was performed in accordance with the method defined by The Japan Society for the Promotion of Science (JSPS), described in "Latest Experimental Technique For Carbon Materials (Analysis Part)," Edited by the Carbon Society of Japan (2001) and as an internal standard silicon powder was used. The related parts of this literature are incorporated herein by reference.

6) Particle's Resistance and Decompressibility 1 g of CNT powder was scaled and then press-loaded into a resinous die (inner dimensions: 40 L, 10W, 80 Hmm), and the displacement and load were read out. A constant current was applied to the powder by the four-terminal method, and in this condition the voltage was measured. After measuring the voltage until the density came to 0.9 g/cm$^3$, the applied pressure was released and the density after decompression was measured. Measurements taken when the powder was compressed to 0.5, 0.8 or 0.9 g/cm$^3$ were adopted as the particle's resistance.

7) Electrical Conductivity

In a specimen, using a 4-pin probe type low resistivity meter (LORESTA-GP, manufactured by Mitsubishi Chemical), the resistance (Ω) at nine points on a coated film surface was measured. Then, the measured values were converted into volume resistivity (Ω·cm) by the resistivity meter, and then an average was calculated.

8) Transverse Rupture Strength

The test piece was cut up into 10 mm wide strips, and then transverse rupture strength (kg/mm$^2$) of the strips was determined with a tension test machine.

9) Thermal Conductivity

The test piece was cut out into a proper shape, and then its thermal conductivity (W/m·K) was determined by the laser flash method.

Synthetic Example 1

By the CVD process, carbon fibrous structures were synthesized using toluene as a raw material.

Figure 1:
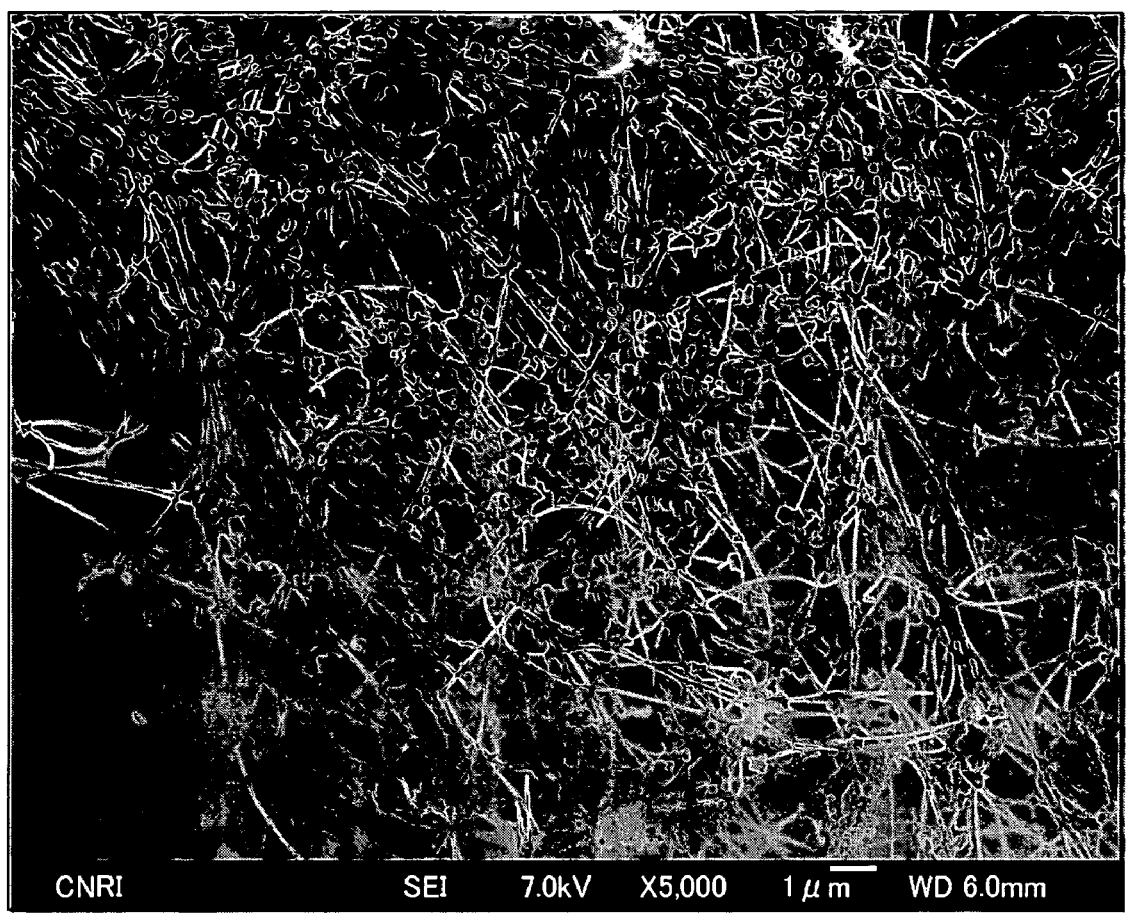
FIG. 1 is a scanning electron micrograph (SEM photo) of an intermediate for the carbon fibrous structure used in a composite material according to one embodiment of the present invention.

The synthesis was carried out in the presence of a mixture of ferrocene and thiophene as the catalyst, and under the reducing atmosphere of hydrogen gas. Toluene and the catalyst were heated to 380° C. along with the hydrogen gas, and then they were supplied to the generation furnace, and underwent thermal decomposition at 1250° C. in order to obtain the carbon fibrous structures (first intermediate). The synthesized first intermediate was baked at 900° C. in nitrogen gas in order to remove hydrocarbons such as tar to obtain a second intermediate. The R value of the second intermediate measured by the Raman spectroscopic analysis was found to be 0.98. Sample for electron microscopes was prepared by dispersing the first intermediate into toluene. FIGS. 1 and 2 show SEM photo and TEM photo of the sample, respectively.

Further, the second intermediate underwent a high temperature heat treatment at 2600° C. The obtained aggregates of the carbon fibrous structures underwent pulverization using an air flow pulverizer in order to produce the carbon fibrous structures according to the present invention. A sample for electron microscopes was prepared by dispersing ultrasonically the obtained carbon fibrous structures into toluene. FIGS. 3, and 4A and 4B show SEM photo and TEM photos of the sample, respectively.

FIG. 5 shows SEM photo of the obtained carbon fibrous structures as mounted on a sample holder for electron microscope, and Table 1 shows the particle distribution of the obtained carbon fibrous structures.

Figure 7:
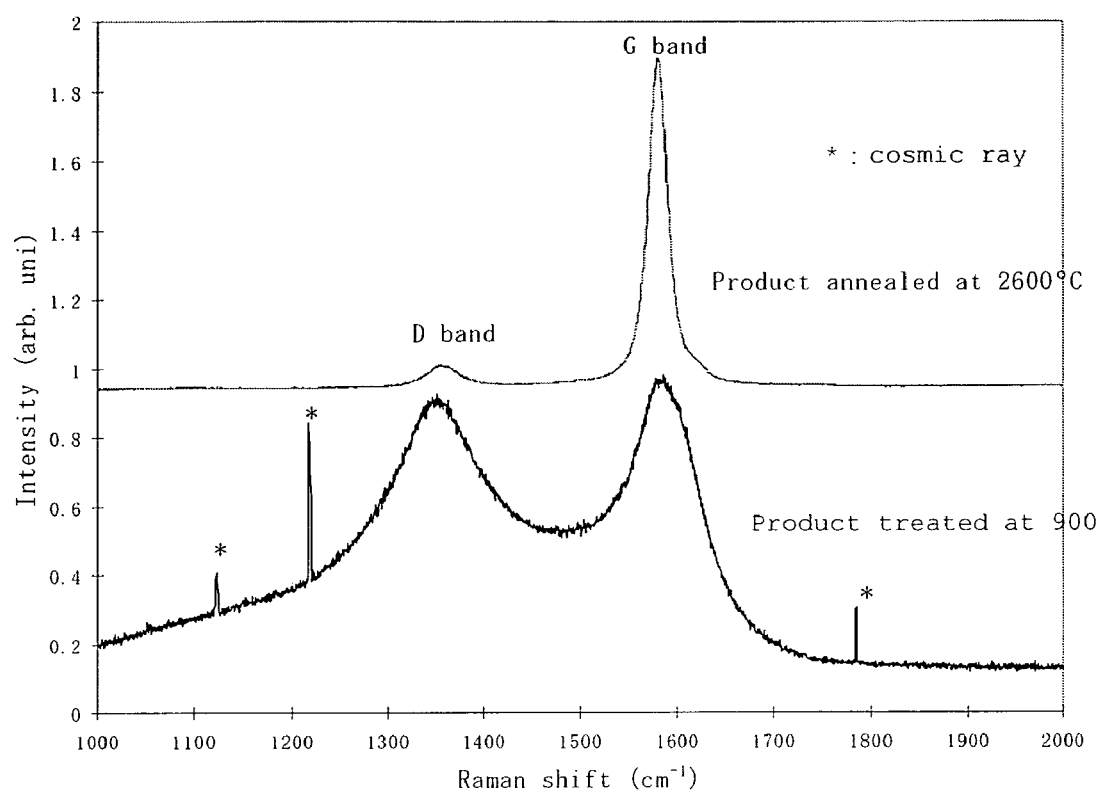
FIG. 7 is Raman spectra of a carbon fibrous structure used in a composite material according to one embodiment of the present invention and an intermediate thereof.

Further, X-ray diffraction analysis and Raman spectroscopic analysis were performed on the carbon fibrous structure before and after the high temperature heat treatment in order to examine changes in these analysis. The results are shown in FIGS. 6 and 7, respectively.

Additionally, it was found that the carbon fibrous structure had an area-based circle-equivalent mean diameter of 72.8 μm, bulk density of 0.0032 g/cm$^3$, Raman $I_D/I_G$ ratio of 0.090, TG combustion temperature of 786° C., spacing of 3.383 Å, particle's resistance of 0.0083Ω·cm, and density after decompression of 0.25 g/cm$^3$.

Table 2 provides a summary of the various physical properties determined in the above examples.

TABLE 1

| Particle Distribution (pieces) | |
| --- | --- |
| <50 μm | 49 |
| 50 μm to <60 μm | 41 |
| 60 μm to 70 μm | 34 |
| 70 μm to <80 μm | 32 |
| 80 μm to <90 μm | 16 |
| 90 μm to <100 μm | 12 |
| 100 μm to <110 μm | 7 |
| >110 μm | 16 |
| Area based circle-equivalent mean diameter | 72.8 μm |

TABLE 2

| | Example 1 |
| --- | --- |
| Area based circle-equivalent mean diameter | 72.8 μm |
| Bulk density | 0.0032 g/cm$^3$ |
| $I_D/I_G$ ratio | 0.090 |
| TG combustion temperature | 786° C. |
| Spacing for (002) faces | 3.383 Å |
| Particle's resistance at 0.5 g/cm$^3$ | 0.0173 Ω · cm |
| Particle's resistance at 0.8 g/cm$^3$ | 0.0096 Ω · cm |
| Particle's resistance at 0.9 g/cm$^3$ | 0.0083 Ω · cm |
| Density after decompression | 0.25 g/cm$^3$ |

Examples 1–7

Epoxy type adhesive compositions were prepared according to the formulations shown in Table 3, by blending the carbon fibrous structures obtained in Synthetic Example 1 with an epoxy resin (ADEKA RESIN™, manufactured by Asahi Denka Co., Ltd.) and a hardener (ADEKA HARDENER™, manufactured by Asahi Denka Co., Ltd.), and then kneading them with a rotation—revolution type centrifugal mixer (Awatori-NERITARO, manufactured by Thinky Co., Ltd.) for ten minutes.

Each epoxy type adhesive compositions thus obtained were applied on a glass plate using an applicator having a coating width of 100 mm and gap of 200 μm. The coated film was then hardened at 170° C. for 30 minutes to obtain a hardened film. The hardened film was then cut up into 50 mm×50 mm test pieces. Using the test pieces, volume resistivity and thermal conductivity were determined. The results obtained are shown in Table 3.

Figure 8:
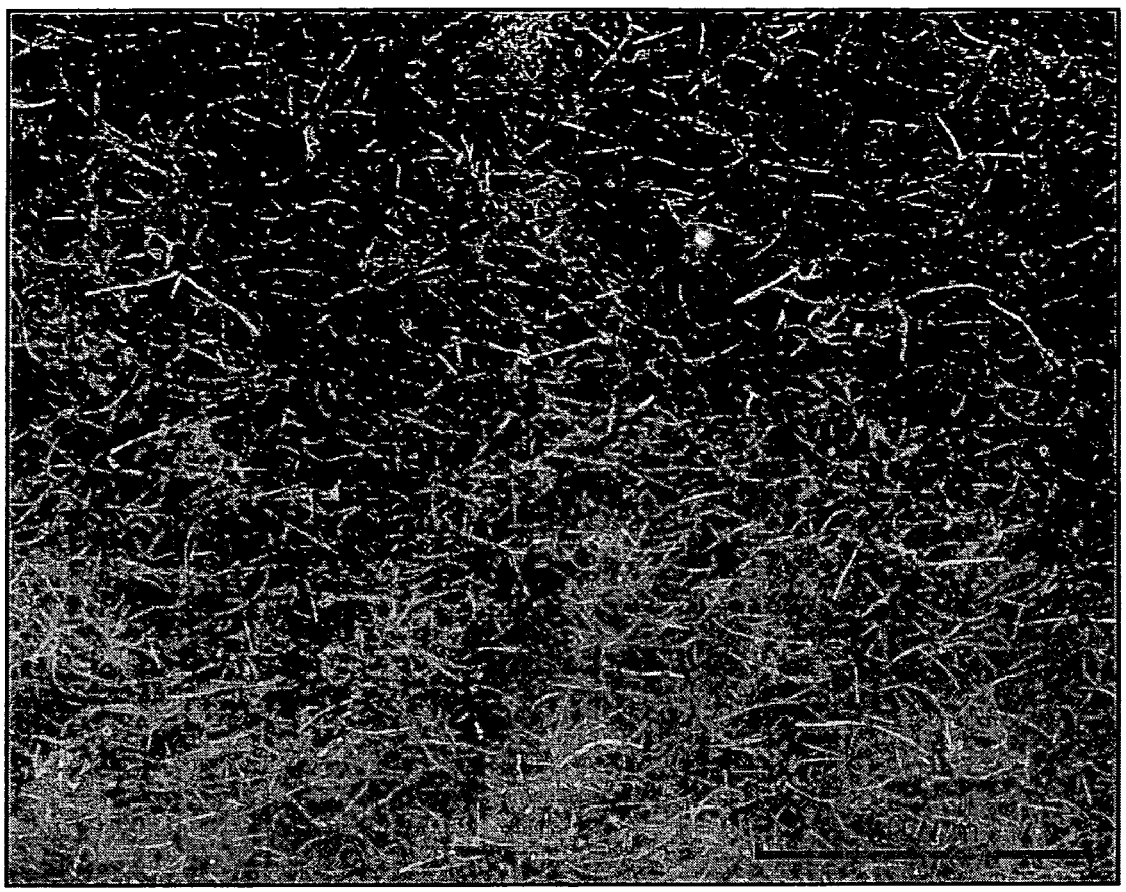
FIG. 8 is an optical microphotograph of a composite material according to one embodiment of the present invention.

A similar epoxy resin composite film was prepared in a similar manner, except that the content of the fibrous carbon structures was set to be 0.5% by weight. The optical micrograph of the film is shown in FIG. 8. It is apparent from FIG. 8 that the carbon fibrous structures show good dispersibility in the resin matrix.

Controls 1–5

Epoxy type adhesive compositions were prepared according to the formulations shown in Table 4, by blending carbon black (#3350B, manufactured by Mitsubishi Chemical) with an epoxy resin (ADEKA RESIN™, manufactured by Asahi Denka Co., Ltd.) and a hardener (ADEKA HARDENER™, manufactured by Asahi Denka Co., Ltd.), and then kneading them with a rotation-revolution type centrifugal mixer (Awatori-NERITARO, manufactured by Thinky Co., Ltd.) for ten minutes.

The epoxy type adhesive composition thus obtained were evaluated in the same manner as in Examples 1–7. The results are shown in Table 4.

TABLE 3

| | Example | | | | | | |
|---|---|---|---|---|---|---|---|
| | 1 | 2 | 3 | 4 | 5 | 6 | 7 |
| EP-4100E | 100 | 100 | | 100 | | 100 | |
| EP-4901E | | | 100 | | 100 | | 100 |
| Carbon fibrous structure | 2 | 4 | 4 | 4 | 4 | 4 | 4 |
| EH-3636AS | 8 | 8 | 8 | | | | |
| EH-4339S | | | | 20 | 20 | | |
| EH-4346S | | | | | | 20 | 20 |
| Volume resistivity ($\Omega \cdot cm$) | $8.9 \times 10^1$ | $3.3 \times 10^0$ | $9.8 \times 10^0$ | $6.3 \times 10^0$ | $1.5 \times 10^0$ | $2.7 \times 10^0$ | $2.4 \times 10^0$ |
| Thermal conductivity (W/m·K) | 1.7 | 3.2 | 3.4 | 2.8 | 3.1 | 2.1 | 2.3 |

EP-4100E: "ADEKA RESIN" EP-4100E, manufactured by Asahi Denka Co., Ltd.; Bisphenol A type epoxy resin, epoxy equivalent: 190
EP-4901E: "ADEKA RESIN" EP-4901E, manufactured by Asahi Denka Co., Ltd.; Bisphenol F type epoxy resin, epoxy equivalent: 170
EH-3636AS: "ADEKA HARDENER" manufactured by Asahi Denka Co., Ltd.; Dicyandiamide
EH-4339S: "ADEKA HARDENER" manufactured by Asahi Denka Co., Ltd.; Aliphatic polyamine type hardener
EH--4346S: "ADEKA HARDENER" manufactured by Asahi Denka Co., Ltd.; Modified imidazole type hardener

TABLE 4

| | Control | | | | |
|---|---|---|---|---|---|
| | 1 | 2 | 3 | 4 | 5 |
| EP-4100E | 100 | 100 | 100 | 100 | |
| EP-4901E | | | | | 100 |
| Carbon black | 2 | 4 | 4 | 4 | 4 |
| EH-3636AS | 8 | 8 | 8 | 8 | 8 |
| Volume resistivity ($\Omega \cdot cm$) | >$10^5$ | >$10^5$ | $1.0 \times 10^4$ | $4.3 \times 10^2$ | >$10^5$ |
| Thermal conductivity (W/m·K) | 0.04 | 0.06 | 0.09 | 0.16 | 0.15 |

EP-4100E: "ADEKA RESIN" EP-4100E, manufactured by Asahi Denka Co., Ltd.; Bisphenol A type epoxy resin, epoxy equivalent: 190
EP-4901E: "ADEKA RESIN" EP-4901E, manufactured by Asahi Denka Co., Ltd.; Bisphenol F type epoxy resin, epoxy equivalent: 170
EH-3636AS: "ADEKA HARDENER" manufactured by Asahi Denka Co., Ltd.; Dicyandiamide Examples 8–13

Resin pellets were prepared according to the formulations shown in Table 5, by blending the carbon fibrous structures obtained in Synthetic Example 1 with a polycarbonate resin (Panlite® L-1225L, manufactured by Teijin Chemicals Ltd.) or a polyamide resin (Leona™ 1300S, manufactured by Asahi Kasei Corporation), followed by melt-kneading them with a twin screw vented extruder (TEM35, manufactured by Toshiba Machine Co., Ltd.).

The pellets thus obtained were dried at 120° C. for ten hours, and then used for injection molding under a prescribed condition to obtain test pieces. Using these test pieces, the volume resistivity and thermal conductivity were determined. The results obtained were shown in Table 5.

Controls 6–11

Resin pellets were prepared according to the formulations shown in Table 6, by blending carbon black (#3350B, manufactured by Mitsubishi Chemical) with a polycarbonate resin (Panlite® L-1225L, manufactured by Teijin Chemicals Ltd.) or a polyamide resin (Leona™ 1300S, manufactured by Asahi Kasei Corporation), followed by melt-kneading them with a twin screw vented extruder (TEM35, manufactured by Toshiba Machine Co., Ltd.).

The pellets thus obtained were dried at 120° C. for ten hours, and then used for injection molding under a prescribed condition to obtain test pieces. Using these test pieces, the volume resistivity and thermal conductivity were determined. The results obtained were shown in Table 6.

TABLE 5

| | Example | | | | | |
|---|---|---|---|---|---|---|
| | 8 | 9 | 10 | 11 | 12 | 13 |
| Polycarbonate | 100 | 100 | 100 | | | |
| Polyamide 66 | | | | 100 | 100 | 100 |
| Carbon fibrous structure | 5 | 10 | 20 | 5 | 10 | 20 |
| Volume resistivity ($\Omega \cdot cm$) | $3.7 \times 10^3$ | $8.6 \times 10^1$ | $9.1 \times 10^1$ | $8.9 \times 10^3$ | $2.3 \times 10^2$ | $1.8 \times 10^1$ |
| Thermal conductivity (W/m·K) | 1.2 | 2.2 | 3.1 | 1.1 | 2.1 | 2.9 |

TABLE 6

| | Control | | | | | |
|---|---|---|---|---|---|---|
| | 6 | 7 | 8 | 9 | 10 | 11 |
| Polycarbonate | 100 | 100 | 100 | | | |
| Polyamide 66 | | | | 100 | 100 | 100 |
| Carbon black | 5 | 10 | 20 | 5 | 10 | 20 |
| Volume resistivity ($\Omega \cdot cm$) | >$10^5$ | >$10^5$ | $8.9 \times 10^5$ | >$10^5$ | >$10^5$ | $4.4 \times 10^5$ |
| Thermal conductivity (W/m·K) | 0.06 | 0.09 | 0.15 | 0.05 | 0.09 | 0.16 |

Examples 14–19

Sheet-shaped test pieces were prepared according to the formulations shown in Table 7, by blending the carbon fibrous structures obtained in Synthetic Example 1 with SBR (Tufdene™ 2003, styrene content of 25% by weight, manufactured by Asahi Kasei Corporation) or NBR(DN401LL, acrylonitrile content of 15% by weight, manufactured by Zeon Corporation), followed by kneading them with a Banbury mixer and rolls, and then vulcanizing the resultant mixture with a press at 150° C. for 20 minutes.

Using these test pieces, the volume resistivity was determined. The results obtained are shown in Table 7.

Controls 12–17

Sheet-shaped test pieces were prepared according to the formulations shown in Table 8, by blending carbon black (#3350B, manufactured by Mitsubishi Chemical) with SBR (Tufdene™ 2003, styrene content of 25% by weight, manufactured by Asahi Kasei Corporation) or NBR(DN401LL, acrylonitrile content of 15% by weight, manufactured by Zeon Corporation), followed by kneading them with a Banbury mixer and rolls, and then vulcanizing the resultant mixture with a press at 150° C. for 20 minutes.

Using these test pieces, the volume resistivity was determined. The results obtained are shown in Table 8.

TABLE 7

|  | Example | | | | | |
| --- | --- | --- | --- | --- | --- | --- |
|  | 14 | 15 | 16 | 17 | 18 | 19 |
| SBR | 100 | 100 | 100 |  |  |  |
| NBR |  |  |  | 100 | 100 | 100 |
| Carbon Fibrous Structure | 5 | 10 | 20 | 5 | 10 | 20 |
| Essential oil | 30 | 30 | 30 | 30 | 30 | 30 |
| Stearic acid | 2 | 2 | 2 | 2 | 2 | 2 |
| Zinc oxide | 3 | 3 | 3 | 3 | 3 | 3 |
| Sulfur | 2 | 2 | 2 | 2 | 2 | 2 |
| Vulcanizing accelerator DM | 1.5 | 1.5 | 1.5 | 1.5 | 1.5 | 1.5 |
| Accelerator TET | 0.5 | 0.5 | 0.5 | 0.5 | 0.5 | 0.5 |
| Volume resistivity ($\Omega \cdot$ cm) | $6.2 \times 10^3$ | $2.8 \times 10^2$ | $1.2 \times 10^1$ | $5.6 \times 10^3$ | $3.9 \times 10^2$ | $7.8 \times 10^1$ |

SBR: Tufdene ™ 2003, styrene content of 25% by weight, manufactured by Asahi Kasei Corporation
NBR: DN401LL, acrylonitrile content of 15% by weight, manufactured by Zeon Corporation
Stearic acid: manufactured by NOF Corporation
Essential oil: Reno pearl 450, manufactured by Fuchs Chemie
Zinc oxide: zinc white #1, manufactured by Sakai Chemical Industry Co., Ltd.
Sulfur: #300, manufactured by Tsurumi Chemical Industrial Co., Ltd.
Vulcanizing accelerator DM: manufactured by Ouchishinko Chemical Industrial Co., Ltd.
Accelerator TET: manufactured by Ouchishinko Chemical Industrial Co., Ltd.

TABLE 8

|  | Control | | | | | |
| --- | --- | --- | --- | --- | --- | --- |
|  | 12 | 13 | 14 | 15 | 16 | 17 |
| SBR | 100 | 100 | 100 |  |  |  |
| NBR |  |  |  | 100 | 100 | 100 |
| Carbon black | 10 | 20 | 30 | 10 | 20 | 30 |
| Essential oil | 30 | 30 | 30 | 30 | 30 | 30 |
| Stearic acid | 2 | 2 | 2 | 2 | 2 | 2 |
| Zinc oxide | 3 | 3 | 3 | 3 | 3 | 3 |
| Sulfur | 2 | 2 | 2 | 2 | 2 | 2 |
| Vulcanizing accelerator DM | 1.5 | 1.5 | 1.5 | 1.5 | 1.5 | 1.5 |
| Accelerator TET | 0.5 | 0.5 | 0.5 | 0.5 | 0.5 | 0.5 |
| Volume resistivity ($\Omega \cdot$ cm) | $>10^5$ | $>10^5$ | $6.5 \times 10^5$ | $>10^5$ | $>10^5$ | $9.7 \times 10^5$ |

SBR: Tufdene ™ 2003, styrene content of 25% by weight, manufactured by Asahi Kasei Corporation
NBR: DN401LL, acrylonitrile content of 15% by weight, manufactured by Zeon Corporation
Stearic acid: manufactured by NOF Corporation
Essential oil: Reno pearl 450, manufactured by Fuchs Chemie
Zinc oxide: zinc white #1, manufactured by Sakai Chemical Industry Co., Ltd.
Sulfur: #300, manufactured by Tsurumi Chemical Industrial Co., Ltd.
Vulcanizing accelerator DM: manufactured by Ouchishinko Chemical Industrial Co., Ltd.
Accelerator TET: manufactured by Ouchishinko Chemical Industrial Co., Ltd.

Examples 20–22

Aluminum nitride powder having an average grain size of 1.5 μm, yttrium oxide having an average grain size of 0.3 μm (2.0 parts by weight), vanadium trioxide (0.1 parts by weight and reduced to vanadium element), and the carbon fibrous structures obtained in Synthetic Example 1 were blended according to the formulations shown in Table 9. Then, to the resultant mixture 100 parts by weight, a binder, which comprises a dispersant (2 parts by weight), polyvinyl butyral (10 parts by weight), dibutyl phthalate as a plasticizer (5 parts by weight) and toluene, was added to prepare a slurry. Next, this slurry was used to form a green sheet using a doctor blade method. The green sheet was die-cut to a prescribed shape in order to obtain a plate-shaped molded article. The plate was heated at 440° C. for three hours in air to remove the binder. After that, the plate was put in a container made of boron nitride and the container was sealed. Then, the plate was sintered in a nitrogen atmosphere by ramping the temperature from 1700° C. to 1950° C. over 3 hours and thereafter maintaining the temperature at 1950° C. for another 3 hours, in order to obtain a test piece 60 mm×60 mm square and 0.35 mm thick. Using the test piece, the thermal conductivity and transverse rupture strength were determined. The results are shown in Table 9.

Controls 18–20

Control samples were prepared in a similar manner as the above Examples. To aluminum nitride powder having an average grain size of 1.5 μm, yttrium oxide having average grain size of 0.3 μm (2.0 parts by weight), vanadium trioxide (0.1 parts by weight and reduced to vanadium element), and carbon black (#3350B, manufactured by Mitsubishi Chemical) were blended according to the formulations shown in Table 10. Then, to the resultant mixture (100 parts by weight), a binder, which comprises a dispersant (2 parts by weight), polyvinyl butyral (10 parts by weight), dibutyl phthalate as a plasticizer (5 parts by weight), and toluene, was added to prepare a slurry. Next, this slurry was used to form a green sheet using a doctor blade method, and the green sheet was die-cut to a prescribed shape in order to obtain plate-shaped molded article. The plate was heated at 440° C. for three hours in air to remove the binder. After that, the plate was put in a container made of boron nitride and the container was sealed. Then, the plate was sintered in a nitrogen atmosphere by ramping the temperature from 1700° C. to 1950° C. over 3 hours and thereafter maintaining the temperature at 1950° C. for another 3 hours in order to obtain a test piece of 60 mm×60 mm square and 0.35 mm thick. Using the test piece, the thermal conductivity and transverse rupture strength were determined. The results are shown in Table 10.

TABLE 9

|  | Example | | |
| --- | --- | --- | --- |
|  | 20 | 21 | 22 |
| Aluminum nitride | 92.5 | 87.5 | 77.5 |
| Yttrium oxide | 2.0 | 2.0 | 2.0 |
| Vanadium trioxide | 0.1 | 0.1 | 0.1 |
| Fine carbon fiber | 5 | 10 | 20 |
| Thermal conductivity (W/m · K) | 145 | 169 | 187 |
| Transverse rupture strength (kg/mm$^2$) | 53 | 67 | 81 |

TABLE 10

|  | Control | | |
| --- | --- | --- | --- |
|  | 18 | 19 | 20 |
| Aluminum nitride | 92.5 | 87.5 | 77.5 |
| Yttrium oxide | 2.0 | 2.0 | 2.0 |
| Vanadium trioxide | 0.1 | 0.1 | 0.1 |
| Carbon black | 5 | 10 | 20 |
| Thermal conductivity (W/m · K) | 101 | 108 | 109 |
| Transverse rupture strength (kg/mm$^2$) | 37 | 36 | 32 |

It is clear from the above Examples (Tables 3–8) that the adhesives, the thermoplastic resins, the rubbers that use carbon fibrous structures as the conductivity imparting agent have volume resistivities of $10^2$ to $10^3$ Ω·cm or less with an additive amount of only 5 parts by weight. In contrast, samples using carbon black as the conductivity improving agent have volume resistivities greater than $10^5$ Ω·cm even when the additive amounts reach 30 parts by weight. Further, with respect to carbon black, because it is necessary to use larger amounts, as compared with the carbon fibrous structures, the resultant adhesives or thermoplastic resins have unnecessarily high melt viscosities and deteriorated physical properties. Using the carbon fibrous structures, such defects are minimized and great improvement in electrical conductivities can be attained.

Also, it is found that great improvement in transverse rupture strength and thermal conductivity can be attained by adding the carbon fibrous structures, as shown in the Examples containing aluminum nitride (Table 9 and 10).

The present invention may be embodied in other specific forms without departing from the scope or essential characteristics thereof. The present embodiments and examples are therefore to be considered in all respects as illustrative and not restrictive, and the scope of the invention is defined by the appended claims rather than by the foregoing description. All changes or modifications, which come within the meaning and range of equivalency of the claims, are therefore intended to be embraced therein.

What is claimed is:

1. A composite material comprising a matrix and carbon fibrous structures,
    wherein each of the carbon fibrous structures comprises a three dimensional network of carbon fibers each having an outside diameter of 15–100 nm, wherein the carbon fibrous structure further comprises a granular part with which carbon fibers are bound in a state such that the carbon fibers extend outwardly from the granular part, and wherein the granular part is produced in a growth process of the carbon fibers, and
    wherein an amount of the carbon fibers added to the matrix is in a range of 0.1 to 30% by weight of a total weight of the composite material.

2. The composite material according to claim 1, wherein the carbon fibrous structures have an area based circle-equivalent mean diameter of 50–100 μm.

3. The composite material according to claim 2, wherein the carbon fibrous structures have a bulk density of 0.0001–0.05 g/cm$^3$.

4. The composite material according to claim 3, wherein the carbon fibrous structure have a bulk density of 0.001–0.02 g/cm$^3$.

5. The composite material according to claim 4, wherein $I_D/I_G$ of the carbon fibrous structures determined by Raman spectroscopy is not more than 0.2, wherein $I_D$ is peak intensity at 1360 cm$^{-1}$ and $I_G$ is peak at 1580 cm$^{-1}$.

6. The composite material according to claim 5, wherein $I_D/I_G$ of the carbon fibrous structures determined by Raman spectroscopy is not more than 0.1.

7. The composite material according to claim 6, wherein the carbon fibrous structures have a combustion initiation temperature in air of not less than 750° C.

8. The composite material according to claim 7, wherein a diameter of the granular part is larger than individual outside diameters of the carbon fibers.

9. The composite material according to claim 8, wherein the carbon fibers are produced using as carbon sources at least two carbon compounds, which have different decomposition temperatures.

10. The composite material according to claim 1, wherein the matrix comprises an organic polymer.

11. The composite material according to claim 1, wherein the matrix comprises an inorganic material.

12. The composite material according to claim 1, wherein the matrix comprises a metal.

13. The composite material according to claim 1, wherein the composite material further comprises at least one filling agent selected from the group consisting of metallic minute particles, silica, calcium carbonate, magnesium carbonate, carbon black, glass fiber and another type of carbon fibers different from the carbon fibrous structures.

14. The composite material according to claim 2, wherein $I_D/I_G$ of the carbon fibrous structures determined by Raman spectroscopy is not more than 0.2, wherein $I_D$ is peak intensity at 1360 cm$^{-1}$ and $I_G$ is peak at 1580 cm$^{-1}$.

15. The composite material according to claim 14, wherein $I_D/I_G$ of the carbon fibrous structures determined by Raman spectroscopy is not more than 0.1.

16. The composite material according to claim 15, wherein the carbon fibrous structures have a combustion initiation temperature in air of not less than 750° C.

17. The composite material according to claim 16, wherein a diameter of the granular part is larger than individual outside diameters of the carbon fibers.

18. The composite material according to claim 17, wherein the carbon fibers are produced using as carbon sources at least two carbon compounds, which have different decomposition temperatures.

19. The composite material according to claim 1, wherein the carbon fibrous structures have a bulk density of 0.0001–0.05 g/cm$^3$.

20. The composite material according to claim 19, wherein the carbon fibrous structure have a bulk density of 0.001–0.02 g/cm$^3$.

21. The composite material according to claim 20, wherein $I_D/I_G$ of the carbon fibrous structures determined by Raman spectroscopy is not more than 0.2, wherein $I_D$ is peak intensity at 1360 cm$^{-1}$ and $I_G$ is peak at 1580 cm$^{-1}$.

22. The composite material according to claim 21, wherein $I_D/I_G$ of the carbon fibrous structures determined by Raman spectroscopy is not more than 0.1.

23. The composite material according to claim 22, wherein the carbon fibrous structures have a combustion initiation temperature in air of not less than 750° C.

24. The composite material according to claim 23, wherein a diameter of the granular part is larger than individual outside diameters of the carbon fibers.

25. The composite material according to claim 24, wherein the carbon fibers are produced using as carbon sources at least two carbon compounds, which have different decomposition temperatures.

26. The composite material according to claim 19, wherein $I_D/I_G$ of the carbon fibrous structures determined by Raman spectroscopy is not more than 0.2, wherein $I_D$ is peak intensity at 1360 cm$^{-1}$ and $I_G$ is peak at 1580 cm$^{-1}$.

27. The composite material according to claim 26, wherein $I_D/I_G$ of the carbon fibrous structures determined by Raman spectroscopy is not more than 0.1.

28. The composite material according to claim 27, wherein the carbon fibrous structures have a combustion initiation temperature in air of not less than 750° C.

29. The composite material according to claim 28, wherein a diameter of the granular part is larger than individual outside diameters of the carbon fibers.

30. The composite material according to claim 29, wherein the carbon fibers are produced using as carbon sources at least two carbon compounds, which have different decomposition temperatures.

31. The composite material according to claim 1, wherein $I_D/I_G$ of the carbon fibrous structures determined by Raman spectroscopy is not more than 0.2, wherein $I_D$ is peak intensity at 1360 cm$^{-1}$ and $I_G$ is peak at 1580 cm$^{-1}$.

32. The composite material according to claim 31, wherein $I_D/I_G$ of the carbon fibrous structures determined by Raman spectroscopy is not more than 0.1.

33. The composite material according to claim 32, wherein the carbon fibrous structures have a combustion initiation temperature in air of not less than 750° C.

34. The composite material according to claim 33, wherein a diameter of the granular part is larger than individual outside diameters of the carbon fibers.

35. The composite material according to claim 34, wherein the carbon fibers are produced using as carbon sources at least two carbon compounds, which have different decomposition temperatures.

36. The composite material according to claim 1, wherein the carbon fibrous structures have a combustion initiation temperature in air of not less than 750° C.37.

37. The composite material according to claim 1, wherein a diameter of the granular part is larger than individual outside diameters of the carbon fibers.

38. The composite material according to claim 1, wherein the carbon fibers are produced using as carbon sources at least two carbon compounds, which have different decomposition temperatures.

* * * * *